Patented Aug. 18, 1953

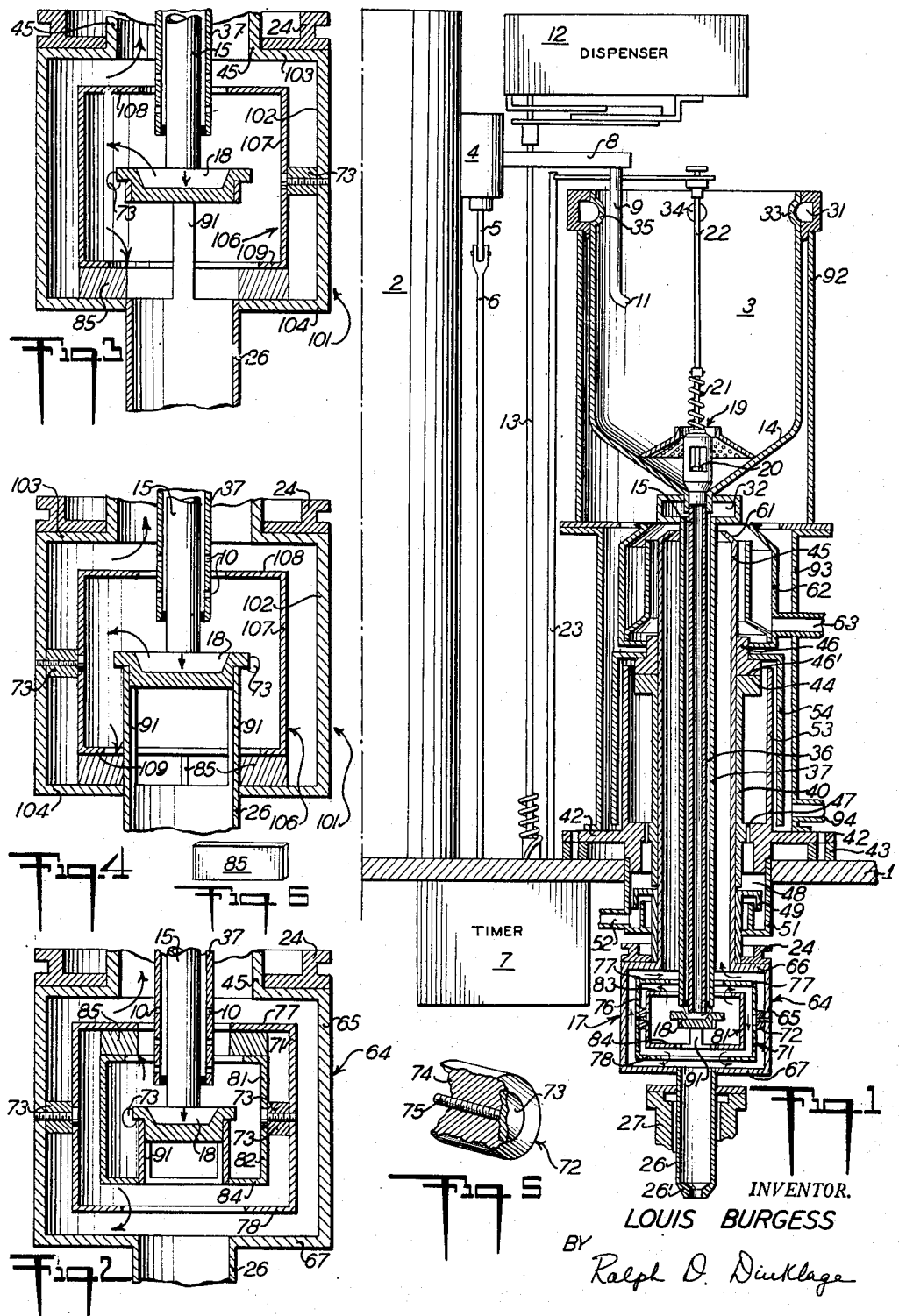

2,649,041

UNITED STATES PATENT OFFICE 2,649,041

COFFEE MAKER

Louis Burgess, Jersey City, N. J.

Application March 14, 1952, Serial No. 276,597

6 Claims. (Cl. 99—283)

The present invention is an improvement upon the coffee maker described in my co-pending application Serial No. 760,599, now Patent Number 2,589,221.

The machine described in said application includes the following elements:

A. A tank from which a predetermined amount of hot water is extracted whenever the machine is operated. The water in this tank is automatically maintained at a predetermined level by a float control inlet valve and this water is automatically maintained at boiling temperature by a thermostatically controlled heating device.

B. A dispenser which delivers a predetermined amount of ground roasted coffee when the machine is operated.

C. A receptacle into which said coffee and said water are introduced and in which they are mixed.

D. An imperforate self-dumping overflow type centrifuge into which the mixture of coffee and water flows from said receptacle and in which the mixture is separated into a clarified coffee beverage which overflows the upper lip or rim of the centrifuge and a residue of coffee grounds which is ejected from said centrifuge after said centrifuge has stopped.

E. A collector ring encircling the overflow lip or rim of the centrifuge by which the clarified coffee beverage is collected and from which it is conducted to a suitable receptacle.

F. An automatic timing device whereby the steps involved in the operation of the machine are carried through in sequence whenever the machine is set in operation.

The improvement described and claimed in this application relates to the imperforate self-dumping overflow type of centrifuge and will be fully understood from the following description read in conjunction with the drawing in which:

Fig. 1 is a side elevation with parts in section through the construction of my invention;

Fig. 2 is a vertical section through part of the construction shown in Fig. 1 on a plane at 90° to the showing in Fig. 1;

Fig. 3 is a vertical section through an alternative embodiment of my invention;

Fig. 4 is a vertical section through the construction shown in Fig. 3 at a 90° angle to the showing in Fig. 3;

Fig. 5 is a perspective view partly in section of one element of the construction shown in Figs. 1-4 inclusive; and Fig. 6 is a perspective view of one element of the construction shown in Figs. 1 and 2.

As explained in said application, the parts of the machine are assembled on base 1 (Fig. 1) supported by suitable legs (not shown). Tank 2, of which only the front end appears in Fig. 1, is also seated on base 1. This tank contains water up to a predetermined level in the upper part thereof, the interior of the tank being connected through piping to any suitable supply of water under pressure and the said predetermined level being automatically maintained by means of a float-controlled valve. The function of the tank is to maintain at all times a supply of water at the boiling point for the coffee making operation and also to provide a relatively continuous supply of steam under very slight pressure, which is piped from the upper end of the tank into the chamber which encloses the moving parts, to keep these parts in a continuously sterile condition and at a uniform temperature of approximately 100° C. To this end the tank is heated adjacent its base by any suitable means, such as gas burners or immersion type electric heaters, the supply of heat being controlled by suitable thermostatic means.

Whenever the machine is set in operation a predetermined amount of this hot water is transferred from the tank 2 into the mixing receptacle 3. The apparatus for this purpose is more fully described in my said application and includes the valve 4 operated through stem 5 by push rod 6 connected into a suitable timer diagrammatically indicated by 7. The water so abstracted passes through horizontal pipe 8 and vertical pipe 9, being discharged into the mixing receptacle 3 through an orifice 11 at the lower end of pipe 9, which orifice is oriented to discharge at an angle between 30 and 60° with reference to the vertical and in a vertical plane, which is non-central with respect to receptacle 3 and tangent to a cylinder of lesser radius than said receptacle. This causes the issuing jet of hot water to impart a rotational movement to the water as it accumulates in receptacle 3 and simultaneously to force beneath the surface of the water any ground coffee dropped into the receptacle, thereby forming a perfect mixture of hot water and ground roasted coffee.

The charge of ground roasted coffee is delivered into receptacle 3 from dispenser 12 which surmounts the receptacle and which is in turn operated through turning of shaft 13, which also is operatively connected into timer 7. The preferred mechanical construction is such that during the operation of the machine a hub carrying radial vanes within dispenser 12 turns to bring a predetermined charge of ground roasted coffee over the discharge outlet and at the commencement of each cycle, the door which covers the lower end of this discharge outlet, slides horizontally to uncover the opening. This door is preferably equipped with projections which extend upwardly into the space traversed by the vanes of the dispenser and which projections insure that the entire charge will be released from the dispenser into the receptacle 3. Receptacle 3 is provided at its lower end with conical bottom 14 connected to rundown tube 15 which extends into the lower end of the centrifuge 17, terminating adjacent the upper surface of the saucer-shaped deflector 18 which is carried by the centrifuge. Flow out of receptacle 3 into the lower end of centrifuge 17 is controlled by a valve 19, the construction of which is described in detail in my said application. This valve includes a small centrally located orifice covered by a poppet 20 and uncovered by spring 21 whenever pressure on stem 22 is released. When stem 22 is lifted, valve 19 in its entirety is moved up out of the way to uncover the full diameter of the opening defined by the upper end of rundown tube 15. The release of pressure on stem 22 and the subsequent lifting of stem 22 is controlled through push-rod 23 which also is operatively connected into timer 7. At the commencement of an operating cycle push-rod 23 is forced downwardly by the timer 7, thereby seating valve 19 and also seating the centrally located poppet 20 to close off the lower end of receptacle 3 and permit the hot water and ground roasted coffee to accumulate in the receptacle. At the expiration of a predetermined time following the start of the machine, the timer sets a motor (not shown) in operation, which through a suitable belt drives the centrifuge 17 through pulley 24 and as soon as the centrifuge has come up to speed, the central orifice in valve 19 is opened. As soon as all or substantially all of the mixture so formed has run down into the centrifuge, the timer again opens valve 4 to discharge a second predetermined amount of hot water through pipes 8 and 9 into receptacle 3, which as it flows into the lower end of the centrifuge displaces upwardly any concentrated extract remaining in the centrifuge. When sufficient of this displacement water has run down into the centrifuge to displace upwardly all the extract remaining therein, the centrifuge is stopped and the remaining contents thereof discharged by gravity through the axially-oriented discharge tube 26 and discharge outlet 26' surrounded by stuffing box 27. Suitable manifolds shown in part and identified by numerals 31 and 32 are connected through suitable piping and a control valve in said piping to a source of hot water. At this stage the timer operates the flush water control valve (not shown) for a brief period to cause jets of water to issue from the turrets 33, 34 and 35 tangentially and downwardly against the inner surface of receptacle 3 thereby cleaning the same simultaneously to cause jets to issue from the tubular space 36 between rundown tube 15 and the surrounding tube 37 through suitable orifices 10 (Fig. 2) directed against the interior of centrifuge 17.

The centrifuge to which this application is particularly directed is rotatably carried in sleeve-bearing 40 integral with and supported by horizontal flange 42. Horizontal flange 42 is in turn supported through suitable spacers 43 by base 1. The bearing 40 terminates at its upper end in the annular horizontal surface 44 adapted to carry the downward thrust of the centrifuge. The centrifuge includes the vertical tubular section 45 journalled in the bearing 40. This tubular section 45 is secured to the horizontally extending shoulder 46, the lower surface 46' of which co-acts with surface 44 to take the downward vertical thrust. The bearing surfaces formed by tube 45, bearing 40 and co-acting surfaces 44 and 46' are supplied with oil lubricant through a suitable pressure feed system (not shown). Any oil escaping between the surfaces 44 and 46' flows downwardly through holes 47 into space 48. Any lubricant escaping from the lower end of the bearing 40 also flows into space 48 from which it is diverted by deflector 49 carried by tube 45 into the trough 51, from which it returns through side outlet 52 to the lubricant reservoir. The bearing 40 also carries the stationary upstanding tubular sleeve 53 and the shoulder 46 also carries the downwardly extending sleeve 54. These sleeves co-act to form a hydrostatic seal which prevents steam from escaping into the bearings when the machine is not in operation.

The tube 45 terminates at its upper end in overflow lip 61 which has an inside diameter less than the inside diameter of the tube 45 and preferably from ⅜–½" less inside diameter. Liquid escaping from the upper end of the centrifuge is thrown off from this overflow lip into collector ring 62, from which it is conducted into any suitable receptacle through side outlet 63.

The lower end of the centrifuge 17 terminates in the enlarged tubular portion 64 comprising tube 65 bounded by the upper annulus 66 and the lower annulus 67. Annulus 67 carries the axially located discharge tube 26 terminating in the discharge outlet 26'. This discharge outlet is of lesser diameter than the inside diameter of the overflow lip 61, to the end that while the centrifuge is in rotation, liquid will be discharged only from the overflow lip 61 and while the centrifuge is at rest, the centrifuge can be freely discharged through the outlet 26'.

Within the enlarged tubular portion 64 there is a concentric shell 71. This shell is carried in spaced relationship to the tube 65 by three small radially disposed studs 72 shown in perspective in Fig. 5. In the actual construction of the device the shell 71 is first drilled to receive the end 73 of these studs, which is of reduced diameter. Shell 71 is then re-chucked and the outer end 74 of these studs turned down concentrically, after which the assembly is again positioned in tube 65 and secured in place by threaded studs 75 which pass through the side wall of the outer tube 65. This shell 71 consisting of a vertical tubular section 76 bounded by a top annulus 77 and bottom annulus 78, defines a concentric opening in the top annulus 77, which is of lesser diameter than the inside diameter of overflow lip 61 and defines a concentric opening in the bottom annulus 78 which is of greater inside diameter than the overflow lip 61.

A third concentric shell 81 is mounted within and in spaced relationship to shell 71. This inner shell 81 consists of the vertical tubular section 82 terminating at its upper end in annulus 83 and at its lower end in annulus 84. The shell 81 is held in spaced relationship to the shell 71 by a system of studs identical with those shown in Fig. 5 and hereinbefore discussed. The upper annulus 75 defines a concentric opening which is of greater diameter than the inside diameter of overflow lip 61. The lower annulus 84 defines a concentric opening of a diameter not exceeding the inside diameter of the overflow lip 61 and preferably not less than the inside diameter of the outlet 26'. This inside shell 81 also carries the upstanding posts 91 which rotatably support the deflector 18. The shell 81 is preferably of an inside height which does not exceed its inside diameter.

Between the annulus 77 and the annulus 83 there are upstanding radial vanes 85. These span or substantially span the vertical gap between annulus 77 and annulus 83. There may be two or more of these vanes although there are preferably from 4–6. One such vane is shown in perspective in Fig. 6. Collectively these vanes constitute an impeller imparting radial outward velocity to the liquid overflowing from the solids-separation section 81.

In operation the inner surface of the liquid contents of the centrifuge will of course be in the form of a tube, the inner wall of which is determined by the inside diameter of the overflow lip 61. Due to the influence of gravity the inside diameter of this surface will of course diminish somewhat in a downward direction. The primary function of the inside shell 81 is to act as a solids-collecting section and for this purpose the centrifugal retaining capacity of this shell should be at least equal to the volume of the charge of ground roasted coffee delivered from dispenser 12. By centrifugal retaining capacity I refer to the total volume of shell 81 excluding therefrom the central tubular section which during operation of the centrifuge is empty due to the centrifugal force. As the mixture of hot water and ground roasted coffee is fed into the centrifuge and diverted by deflector 18 into the shell 81, the shell will gradually fill until it begins to overflow from the upper concentric opening into the space between shells 81 and 71. As soon as this concentric space has become filled, the liquid will overflow from the concentric opening in annulus 78 into the space between shells 71 and 64 and will thence move upwardly, being finally discharged from the upper surface of overflow lip 61. The actual mass of liquid retained between any two concentric shells is of lesser radial thickness than that retained within the inside shell 81, so that the space between shells constitutes an extended clarifying section extending from the inside of shell 81 to the overflow lip 61. The vertical tubular section 45 of course constitutes an extension of this clarifying section.

One advantage of this construction is that it provides an extended clarifying section without unduly increasing the over-all height of the centrifuge as a whole, and in fact even rendering it possible to reduce the height of the tubular portion 45. Another advantage is that it provides a clarifying section which is relatively more effective. Another advantage of the construction is that notwithstanding the foregoing, whenever the rotation of the centrifuge is stopped, each and every part of the centrifuge is self-dumping and self-draining.

In actual construction of a device having an over-all capacity of approximately 6 cups in a 90 second cycle similar to that described in my application hereinabove referred to, the tubular section 45 has an inside diameter of $1\frac{1}{4}''$. The inside diameter of the overflow lip 61 is $\frac{7}{8}''$. The inside diameter of the solids- separation section 81 is $3''$, the height is $2\frac{1}{4}''$ and the concentric radial space between the shells 64, 71 and 81 is approximately $\frac{3}{16}''$. With these dimensions fixed, the shells 71 and 81 may be composed of stainless steel of a thickness of approximately $\frac{3}{32}''$ and the outer shell 64 of a thickness of approximately $\frac{1}{8}''$.

The receptacle 3 is surrounded by the tubular section 92 while the centrifuge and bearings are surrounded by the tubular section 93. These sections 92 and 93 constitute therefore a casing into which some steam from the upper end of tank 2 is continuously admitted through suitable means (not shown) to keep the parts always at a satisfactory working temperature, any condensate so formed escaping from side outlet 94.

In Figs. 3 and 4 I have shown an alternative embodiment of the device in which the tubular section 45 is connected to shell 101, including vertical tubular section 102, upper concentric annulus 103, secured to the lower end of tube 45 and lower concentric annulus 104, which is in turn connected to axial discharge outlet 26'. Shell 106 is located within shell 101 consisting of tubular section 107 carrying upper annulus 108 and lower annulus 109. Upper annulus 108 defines a concentric opening which is not greater than the inside diameter of overflow lip 61. Lower annulus 109 defines a concentric opening which is greater than the inside diameter of overflow lip 61. In this case the radial vanes 85 are interposed between the lower surface of annulus 109 and the upper surface of annulus 104 thereby constituting an impeller for the liquid overflowing from solids-separation section 106 through the concentric opening defined by annulus 109.

The observations heretofore made with respect to the volumetric capacity of shell 81 apply also to the volumetric capacity of shell 106, which has similarly a solids-collecting section. In this case as the mixture is delivered into the centrifuge and diverted by deflector 18, it accumulates in shell 106 until it begins to overflow the concentric opening in annulus 109, whereupon it accumulates in concentric space between shells 106 and 101 until it eventually begins to overflow the lip 61. For this reason the concentric space between shells 106 and 101 constitutes an extension of the clarifying zone defined by tubular section 45. It will be noted that in this case the direction of flow between the shells is upward, whereas in the construction shown in Fig. 1 the direction of flow between the two inside shells is downward, this direction of flow being axially reversed as the liquid passes from this space into the concentric space between shells 71 and 64. With the construction shown in Figs. 3 and 4 and since the opening in the lower end of the inside shell is of greater diameter than the inside diameter of the discharge outlet, it is preferred to support the deflector 18 by posts extending upwardly from the waste tube 26 secured to annulus 104.

I claim:

1. In a coffee maker including a vertically disposed centrifuge of the imperforate overflow type carrying at its upper end an inwardly projecting overflow lip and at its lower end an axial discharge outlet of lesser diameter than said overflow lip, said coffee maker also including a receptacle above said overflow lip, a dispenser surmounting said receptacle, a timer, means controlled by said timer for introducing a predetermined amount of water and means controlled by said timer for discharging a predetermined amount of ground roasted coffee from said dispenser into said receptacle, means for comingling said water with said coffee in said receptacle to form a mixture, a rundown tube extending from said receptacle into said centrifuge and a deflector in said centrifuge adjacent the lower end of said rundown tube, the improved centrifuge construction comprising a solids collecting section at least substantially equal in centrifugal retaining capacity to said predetermined amount of coffee, consisting of a first shell substantially symmetrical with respect to said deflector defining a concentric opening at one end not greater in diameter than said overflow lip and not substantially less in diameter than said discharge outlet and defining a concentric opening at the other end of greater diameter than said overflow lip, a second shell surrounding and concentric with said first shell defining a concentric opening at one end not greater in diameter than said overflow lip and not substantially less in diameter than said discharge outlet and defining a concentric opening at the other end of greater diameter than said overflow lip, said first and second shells being spaced apart to retain therebetween a tubular body of liquid of lesser radial thickness than is retained within said first shell, and said ends of greater and lesser diameter being reversed in relation to the ends of greater and lesser diameter of said first shell to direct overflow from said first shell into the space between said first and second shells, the space between said first and second shells constituting at least part of a clarifying section extending between said solids-collecting section and said overflow lip.

2. A coffee maker according to claim 1 comprising in addition a third shell concentric with said first and second shells defining a concentric opening at one end not greater in diameter than said overflow lip and not substantially less in diameter than said discharge outlet and defining a concentric opening at the other end of greater diameter than said overflow lip, said third and second shells being spaced apart to retain therebetween a tubular body of lesser radial thickness than is retained within said first shell, and said ends of greater and lesser diameter being reversed in relation to the ends of greater and lesser diameter of said second shell, to direct overflow from said second shell into the space between said second and third shells, the space between said first and second shells and the space between said second and third shells constituting at least part of a clarifying section extending between said solids collecting section and said overflow lip.

3. In a coffee maker including a vertically disposed centrifuge of the imperforate overflow type carrying at its upper end an inwardly projecting overflow lip and at its lower end an axial discharge outlet of lesser diameter than said overflow lip, said coffee maker also including a receptacle above said overflow lip, a dispenser surmounting said receptacle, a timer, means controlled by said timer for introducing a predetermined amount of water and means controlled by said timer for discharging a predetermined amount of ground roasted coffee from said dispenser into said receptacle, means for comingling said water with said coffee in said receptacle to form a mixture, a rundown tube extending from said receptacle into said centrifuge and a deflector in said centrifuge adjacent the lower end of said rundown tube, the improved centrifuge construction comprising a solids-collecting section at least substantially equal in centrifugal retaining capacity to said predetermined amount of coffee, consisting of a first shell substantially symmetrical with respect to said deflector defining a concentric opening at the lower end not greater in diameter than said overflow lip and not substantially less in diameter than said discharge outlet and defining a concentric opening at the upper end of greater diameter than said overflow lip, a second shell surrounding and concentric with said first shell defining a concentric opening at the upper end not greater in diameter than said overflow lip and defining a concentric opening at the lower end of greater diameter than said overflow lip, a third shell surrounding and concentric with said first and second shells defining a concentric opening at the upper end of greater diameter than said overflow lip and defining a concentric opening at the lower end, which is the said discharge outlet, said first and second and said second and third shells being spaced apart to retain therebetween a tubular body of lesser radial thickness than is retained within said first shell, the space between said first and second shells and the space between said second and third shells constituting at least a part of a clarifying section extending between said solids-collecting section and said overflow lip.

4. In a coffee maker including a vertically disposed centrifuge of the imperforate overflow type carrying at its upper end an inwardly projecting overflow lip and at its lower end an axial discharge outlet of lesser diameter than said overflow lip, said coffee maker also including a receptacle above said overflow lip, a dispenser surmounting said receptacle, a timer, means controlled by said timer for introducing a predetermined amount of water and means controlled by said timer for discharging a predetermined amount of ground roasted coffee from said dispenser into said receptacle, means for comingling said water with said coffee in said receptacle to form a mixture, a rundown tube extending from said receptacle into said centrifuge and a deflector in said centrifuge adjacent the lower end of said rundown tube, the improved centrifuge construction comprising a solids-collecting section at least substantially equal in centrifugal retaining capacity to said predetermined amount of coffee, consisting of a first shell substantially symmetrical to said deflector defining a concentric opening at the upper end not greater in diameter than said overflow lip and defining a concentric opening at the lower end of greater diameter than said overflow lip, a second shell surrounding and concentric with said first shell defining a concentric opening at the upper end greater in diameter than said overflow lip and defining a concentric opening at the lower end which is the said discharge outlet, said first and second shells being spaced apart to retain therebetween a tubular body of liquid of lesser radial thickness than is retained within said first shell, the space between said first and second shells constituting at least part of a clarifying section extending between said solids-collecting section and said overflow lip.

5. A coffee maker according to claim 3 comprising in addition radial vanes constituting an impeller between the upper surface of said first shell and the adjacent surface of said second shell.

6. A coffee maker according to claim 4 comprising in addition radial vanes between the lower surfaces of said first shell and the adjacent surface of said second shell.

LOUIS BURGESS.

References Cited in the file of this patent
UNITED STATES PATENTS

| Number | Name | Date |
|---|---|---|
| 2,589,335 | Burgess | Mar. 18, 1952 |